US008306288B2

(12) United States Patent
Rahmes et al.

(10) Patent No.: US 8,306,288 B2
(45) Date of Patent: Nov. 6, 2012

(54) AUTOMATIC IDENTIFICATION OF FINGERPRINT INPAINTING TARGET AREAS

(75) Inventors: Mark Rahmes, Melbourne, FL (US); Josef Allen, Melbourne, FL (US); David Lyle, Titusville, FL (US); Brian Hicks, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 611 days.

(21) Appl. No.: 12/543,775

(22) Filed: Aug. 19, 2009

(65) Prior Publication Data

US 2011/0044514 A1    Feb. 24, 2011

(51) Int. Cl.
*G06K 9/00* (2006.01)
(52) U.S. Cl. ....................................... 382/124
(58) Field of Classification Search .................. None
See application file for complete search history.

(56) References Cited

U.S. PATENT DOCUMENTS

| | | | |
|---|---|---|---|
| 5,572,596 A | 11/1996 | Wildes et al. | |
| 5,963,656 A | 10/1999 | Bolle et al. | |
| 6,987,520 B2 * | 1/2006 | Criminisi et al. | 345/629 |
| 7,230,429 B1 | 6/2007 | Huang et al. | |
| 7,502,497 B2 | 3/2009 | Hamid | |
| 7,616,787 B2 | 11/2009 | Boshra | |
| 7,787,668 B2 | 8/2010 | Lu et al. | |
| 7,881,913 B2 * | 2/2011 | Smith et al. | 703/2 |
| 7,912,255 B2 * | 3/2011 | Rahmes et al. | 382/124 |
| 8,050,463 B2 * | 11/2011 | Hamza | 382/115 |
| 2002/0146178 A1 | 10/2002 | Bolle et al. | |
| 2005/0084179 A1 | 4/2005 | Hanna et al. | |
| 2005/0204329 A1 * | 9/2005 | Pauca et al. | 716/21 |
| 2005/0248725 A1 | 11/2005 | Ikoma et al. | |
| 2007/0230754 A1 | 10/2007 | Jain et al. | |
| 2008/0080752 A1 * | 4/2008 | Rahmes et al. | 382/124 |
| 2009/0116763 A1 * | 5/2009 | Hwang et al. | 382/266 |
| 2010/0231659 A1 | 9/2010 | Ohta | |
| 2010/0232654 A1 | 9/2010 | Rahmes et al. | |
| 2010/0232659 A1 | 9/2010 | Rahmes et al. | |
| 2010/0284565 A1 | 11/2010 | Benkley et al. | |

(Continued)

FOREIGN PATENT DOCUMENTS

EP        1246120 A1    10/2002

(Continued)

OTHER PUBLICATIONS

Choi, et al., "Fingerprint Image Mosaicking by Recursive Ridge Mapping" IEEE Transactions on Systems, Man and Cybernetics. Part B: Cybernetics, IEEE Service Center, Piscataway, NJ, vol. 37, No. 5, Oct. 1, 2007, pp. 1193-1196.

(Continued)

*Primary Examiner* — Vikkram Bali
(74) *Attorney, Agent, or Firm* — Fox Rothschild, LLP; Robert J. Sacco (57) ABSTRACT

A system and method for inpainting areas in a fingerprint image is provided. The method includes the steps of dividing a fingerprint image into a plurality of image blocks (506) and computing a plurality of block scores for the plurality of image blocks (508). The method also includes generating a blur matrix for the fingerprint image based on the plurality of block scores (510). The method further includes deriving an inpaint region (IR) matrix for the fingerprint image based on a weighting function and the blur matrix, the IR matrix identifying a portion of the plurality of image blocks for inpainting (512, 514).

20 Claims, 4 Drawing Sheets

U.S. PATENT DOCUMENTS

2011/0044513 A1    2/2011    McGonagle et al.

FOREIGN PATENT DOCUMENTS

| EP | 1788524 A1 | 5/2007 |
|---|---|---|
| WO | WO-98 08439 A1 | 3/1998 |
| WO | WO-99 38121 A1 | 7/1999 |
| WO | WO-2005034021 A1 | 4/2005 |

OTHER PUBLICATIONS

Maltoni, D., et al., "Handbook of Fingerprint Recognition, Chapter 4, Fingerprint Matching" Jan. 1, 2003, Handbook of Fingerprint Recognition: [Springer Professional Computing], Springer Verlag, New York, US, pp. 131-171.

Maltoni, D., et al., "Handbook of Fingerprint Recognition, Contents" Jun. 2003, XP002589605, pp. v-vii.

Ross, A., et al., "Fingerprint Warping Using Ridge Curve Correspondences" IEEE Transactions on Pattern Analysis and Machine Intelligence, IEEE Service Center, Los Alamitos, CA, US, vol. 28, No. 1., Jan. 1, 2006, pp. 19-30.

Zhang, Z., "Iterative Point Matching for Registration of Free-Form Curves and Surfaces" International Journal of Computer Vision, Kluwer Academic Publishes, Norwell, US, vol. 13, No. 2, Oct. 1, 1009, pp. 119-152.

Harris Corp., International Search Report mailed Jul. 22, 2010, Application Serial No. PCT/US2010/026714.

Camus, T A et al: "Reliable and fast eye finding in close-up images" Pattern Recognition, 2002. Proceedings. 16th International Conference on Quebec City, Que., Canada Aug. 11-15, 2002, Los Alamitos, CA, USA,IEEE Comput. Soc, US LNKD—D01:10.1109/ICPR. 2002.1044732, vol. 1, Aug. 11, 2002,pp. 389-394, XP010613355 ISBN: 978-0-7695-1695-0.

Ghouti, L., et al: "Iris fusion for multibiometric systems" Signal Processing and Information Technology (ISSPIT), 2009 IEEE International Symposium on, IEEE, Piscataway, NJ, USA, Dec. 14, 2009, pp. 248-253, XP031624872.

Wei, Z., et al: "Synthesis of large realistic iris databases using patch-based sampling" 19th International Conference on Pattern Recognition, 2008: ICPR 2008; Dec. 8-11, 2008, Tampa, Florida, USA, IEEE, Piscataway, NJ, Dec. 8, 2008, pp. 1-4, XP031412267.

International Search Report mailed Sep. 6, 2010, Application Serial No. PCT/US2010/026684, in the name of Harris Corporation.

Rahmes, M., et al., Autonomous Selection of PDE Inpainting Techniques vs. Exemplar Inpainting Techniques for Void Fill of High Resolution Digital Surface Models, Apr. 10, 2001, Proc. of SPIE, vol. 6564, pp. 656405-1 thru 656405-10.

Information about Related Patents and Patent Applications, see section 6 of the accompanying Information Disclosure Statement Letter, which concerns Related Patents and Patent Applications, Apr. 2, 2012.

Wexler, et al, Space-Time Video Completion, Jun. 27-Jul. 2, 2004, Proceedings of the 2004 IEEE Computer Society on Computer Vision and Pattern Recognition, vol. 1, 8 total pages.

Mitchell, H.B. "Multi-Sensor Data Fusion", 2007, Springer, XP002618958.

Can A, et al.: "A Feature-Based Technique for Joint, Linear Estimation of High-Order Image-to-Mosaic Transformations: Mosaicing the Curved Human Retina", IEEE Transactions on Pattern Analysis and Machine Intelligence, IEEE Service Center, Los Alamitos, CA, US, vol. 24, No. 3, Mar. 1, 2002, pp. 412-419, XP011094218.

Mitchell, H.B.: "Image Fusion: Theories, Techniques and Applications", 2010, Springer, XP002618959.

Can A et al.: "A Feature-Based, Robust, Hierarchical Algorithm for Registering Pairs of Images of the Curved Human Retina", IEEE Transactions on Pattern Analysis and Machine Intelligence, IEEE Service Center, Los Alamitos, CA, US, vol. 24, No. 3,Mar. 1, 2002, pp. 347-364, XP011094213.

Ramoser, H., et al.: "Computationally Efficient and Reliable Fingerprint Mosaicking on Embedded Hardware Using Minutiae", Machine Graphics and Vision, Institute of Computer Science, Warzaw, PL, vol. 13, No. 4, Oct. 1, 2004, pp. 401-415, XP008132171.

Choi K., et al.: "Fingerprint Mosaicking by Rolling and Sliding", Jun. 28, 2005, Audio- and Video-Based Biometric Person Authentication; [Lecture Notes in Computer Science;;LNCS], Springer-Verlag, Berlin/Heidelberg, pp. 260-269, XP019013279.

Bhatia, K.K., et al.: "Consistent Groupwise Non-Rigid Registration for Atlas Construction", Biomedical Imaging: Macro to Nano, 2004. IEEE International Symposium on Arlington,VA, USA Apr. 15-18, 2004, Piscataway, NJ, USA, IEEE, Apr. 15, 2004, pp. 908-911, XP010774080.

Harris Corporation, International Search Report mailed Feb. 10, 2011; Application Serial No. PCT/US2010/043796.

Agarwal, M.: "Multi-Impression Enhancement of Fingerprint Images", M.SC. Thesis, University. of West Virginia, [Online] 2006 [retrieved on Jan. 18, 2011]. Retrieved from the Internet: <URL: <http://wvuscholar.wvu.edu:8881//exlibris/dtl/d3_1/apache_media/20964.pdf>>. pp. I-VII, 1-97, XP002617438.

Hong, L., et al.: "Fingerprint Image Enhancement: Algorithm and Performance Evaluation", IEEE Transactions on Pattern Analysis and Machine Intelligence, vol. 20, No. 8, Aug. 1, 1998, pp. 777-789, XP000774452.

Li, Xin, et al.: "Novel Sequential Error-Concealment Techniques Using Orientation Adaptive Interpolation", IEEE Transactions on Circuits and Systems for Video Technology, vol. 12, No. 10, Oct. 1, 2002, pp. 857-864, XP011071882.

Harris Corporation, International Search Report mailed Feb. 7, 2011; Application Serial No. PCT/US2010/044424.

Williams, J. A., et al., "Simultaneous Registration of Multiple Point Sets Using Orthonormal Matrices", IEEE *International Conference on Acoustics, Speech, and Signal Processing*, 2000. (*ICASSP '00*)., pp. 2199-2202 vol. 4, 2000.

Jain, A., et al., "Fingerprint mosaicking," *IEEE International Conference on Acoustics, Speech, and Signal Processing*, 2002. (*ICASSP '02*)..pp. IV-4064-IV-4067 vol. 4, May 13-17, 2002.

Ross, A., et al., "Image Versus Feature Mosaicing: A Case Study in Fingerprints," *Proceedings of SPIE Conference on Biometric Technology for Human Identification*, vol. 6202, Orlando, USA, Apr. 12, 2006.

Moon, Y.S., "Template synthesis and image mosaicking for fingerprint registration: an experimental study," *IEEE International Conference on Acoustics, Speech, and Signal Processing*, 2004. (*ICASSP '04*). pp. V-409-V-412 vol. 5, May 17-21, 2004.

Rahmes, M., et al., Fingerprint Reconstruction Method Using Partial Differential Equation and Exemplar-based Inpainting Methods, IEEE, Sep. 2007.

McGonagle, M., et al., U.S. Appl. No. 12/543,723, filed Aug. 19, 2009, "Method for N-Wise Registration and Mosaicing of Partial Prints".

\* cited by examiner

AUTOMATIC IDENTIFICATION OF FINGERPRINT INPAINTING TARGET AREAS

BACKGROUND OF THE INVENTION

1. Statement of the Technical Field

The invention is directed to biometric systems. In particular, the invention is directed to fingerprint inpainting including automatic identification of fingerprint inpainting target areas.

2. Description of the Related Art

Biometric systems are used to identify individuals based on their unique traits. Biometrics are useful in many applications, including security and forensics. Some physical biometric markers include facial features, fingerprints, hand geometry, and iris and retinal scans. A biometric system can authenticate a user or determine the identity of sampled data by querying a database.

There are many advantages to using biometric systems. Most biometric markers are easily collectable, present in most individuals, unique between individuals, and permanent throughout the lifespan of an individual. However, these factors are not guaranteed. For example, surgical alterations may be used to change a biometric feature such that it does not match one previously collected from the same individual. Furthermore, different biometric features can change over time.

A common type of biometric identification is fingerprinting. A fingerprint is an impression of the raised friction ridges on the epidermis. In general, fingerprints have lasting permanence and are unique to an individual, making them a robust means for identification. Additionally, fingerprints are easily collectable, as they may be collected from many types of surfaces. Fingerprints are more intrusive than some less accurate biometric identification methods, such as facial recognition or voice print identification methods. Still, they are less intrusive than other accurate biometric identification methods, such as iris scans and DNA. As a result, fingerprints are currently the most common type of biometric identification and are likely to remain so for the foreseeable future.

The use of fingerprints as a form of biometric identification began with manual methods for collecting fingerprints and evaluating matches. Identification was performed at one time by manually comparing a collected fingerprint to fingerprints on a card collected using an "ink technique" (i.e., pressing and rolling an individual subject's inked finger). Such methods have now been automated by the use of automated identification systems to compare fingerprint images. The term "fingerprint image" as used herein refers to a digital image of a fingerprint. The "ink technique" is still in use today; however these cards are now scanned to create fingerprint images for use in automated identification systems. In addition to the "ink technique", fingerprint images can also be generated via the use of solid-state fingerprint readers. Solid-state fingerprint sensors generally work based on capacitance, thermal, electric field, laser, radio frequency, and/or other principles. Such fingerprint sensors typically generate 2-dimensional fingerprint images, although some fingerprint sensors generate 3-dimensional fingerprint images.

Even though fingerprints are unique across individuals, they generally include several types or levels of common or "key" features. Automated identification systems utilize such key features during fingerprint recognition processes. That is, these systems compare the locations, number, and types of key features in an acquired fingerprint image to determine the identity of the individual associated with the acquired fingerprint. Level 1 features of fingerprints include loops, whorls and arches formed by the ridges. These features describe the overall shape followed by the ridges. Level 2 features of fingerprints, or minutiae, are irregularities or discontinuities in the ridges. These include ridge terminations, bifurcations, and dots. Level 3 features of fingerprints include ridge pores, ridge shape, as well as scarring, warts, creases and other deformations.

SUMMARY OF THE INVENTION

Embodiments of the invention concern systems and methods for automatic identification of fingerprint inpainting areas. In a first embodiment of the invention, a method for inpainting areas in a fingerprint image is provided. The method includes dividing a fingerprint image into a plurality of image blocks and computing a plurality of block scores for the plurality of image blocks. The method also includes generating a blur matrix for the fingerprint image based on the plurality of block scores. The method further includes deriving an inpaint region (IR) matrix for the fingerprint image based on a weighting function and the blur matrix, the IR matrix identifying a portion of the plurality of image blocks for inpainting.

In a second embodiment of the invention, a fingerprint processing system is provided. The system includes a storage element for storing a fingerprint image and a processing element communicatively coupled to the storage element. The processing element is configured for dividing the fingerprint image into a plurality of image blocks and computing a plurality of block scores for the plurality of image blocks. The processing element is also configured for generating a blur matrix for the fingerprint image based on the plurality of block scores. The processing element is further configured for deriving an inpaint region (IR) matrix for the fingerprint image based on a weighting function and the blur matrix, the IR matrix identifying a portion of the plurality of image blocks suitable for inpainting.

In a third embodiment of the invention, a computer-readable storage medium, having stored thereon a computer program for inpainting areas in a fingerprint image, is provided. The computer program has a plurality of code sections executable by a computer. The code sections cause the computer to perform the steps of dividing a fingerprint image into a plurality of image blocks and computing a plurality of block scores for the plurality of image blocks. The code sections also cause the computer to perform the step of generating a blur matrix for the fingerprint image based on the plurality of block scores. The code sections further cause the computer to perform the step of deriving an inpaint region (IR) matrix for the fingerprint image based on a weighting function and the blur matrix, the IR matrix identifying a portion of the plurality of image blocks suitable for inpainting.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, fingerprint recognition processes typically rely on a minimum amount of matching between fingerprint data in a fingerprint template and a fingerprint of interest. The term "fingerprint template", as used herein, refers to a collection of information specifying the type, size, and/or locations of key features in one or more fingerprints associated with an individual. In particular, fingerprint recognition requires that at least some number of key features in the fingerprint of interest match with a high degree of certainty, the key features stored in the template. However, fingerprints are not always acquired under ideal conditions. For example, law enforcement investigators often need to rely upon partial or poor quality images of fingerprints acquired at a crime scene. Consequently, these fingerprint images may not contain a sufficient number of key features to allow a good match to a stored fingerprint image, frustrating further investigation of the crime. Although manual and automatic image processing techniques exist for removing some amounts of noise and blurring from acquired fingerprint images, such enhancement techniques may remove key features from the fingerprint image and exacerbate the fingerprint recognition process. A greater concern arises in the case of inpainting (i.e., the extrapolation of ridges to reconstruct fingerprint images). Although existing ridges can be used to reconstruct portions of a fingerprint image, the uniqueness of fingerprint often results in a failure to generate a key feature properly. Even worse, artificial key features may be generated during the reconstruction. As a result, the use of finger reconstruction techniques can actually reduce the likelihood of matching a fingerprint image to a stored fingerprint image or fingerprint template in a database.

To overcome these and other problems, embodiments of the invention provide systems and methods for inpainting fingerprint images, including automatic identification of fingerprint inpainting target areas. In particular, embodiments of the invention leverage fingerprint information gathered and/or generated during image processing (e.g., ridge flow direction and image quality) to selectively identify areas of partial fingerprint images to which inpainting is to be applied. By using the fingerprint information acquired during image processing, extrapolation of fingerprint features is performed only in those areas for which extrapolation is expected to accurately depict the missing features of the fingerprint. Thus, the amount of extrapolation is limited, reducing or eliminating the likelihood that key features will be altered or that artificial key features will be generated. An inpainting process in accordance with the various embodiments of the invention is conceptually illustrated with respect to FIGS. 1-4.

Figure 1:
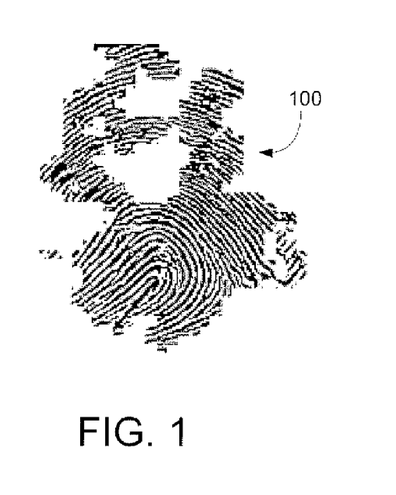
FIG. 1 is a processed fingerprint image that is useful for understanding an inpainting process in accordance to an embodiment of the invention.

FIG. 1 is a processed fingerprint image 100 that is useful for understanding an inpainting process in accordance to an embodiment of the invention. In particular, FIG. 1 shows the result of image processing. The term "fingerprint image processing", as used herein, refers to any type of image processing and/or image characterization applied to an acquired fingerprint image. For example, fingerprint images often include unnecessary information such as scars, moisture-induced features, or areas without valuable ridges and furrows. Therefore, in order to eliminate the redundant information, filter the useful information, and enhance existing features, processes such as normalization (e.g., filtering and contrast enhancement), binarization (i.e., conversion to 1-bit image), quality markup (useless or poor quality data removal), and/or thinning processes (i.e., ridge enhancement) are used to generate the fingerprint to be used for identification. In the various embodiments of the invention, an acquired fingerprint image is divided into blocks of n×n pixels and each of the blocks is binarized. Subsequently, the blocks including poor information, are removed, resulting in the block-type edges or block-type voids shown in processed image 100. Additionally, information regarding the direction and type of features (i.e., ridge or valley) in each of the remaining blocks is stored.

Figure 2:
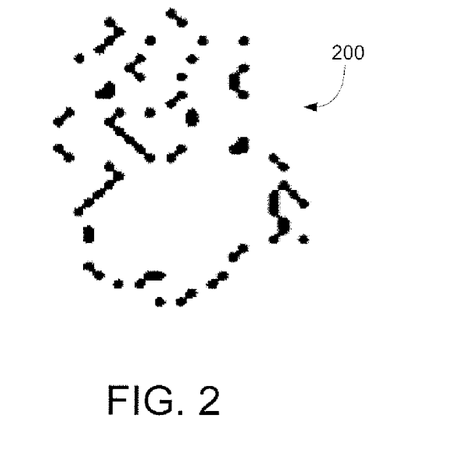
FIG. 2 is an image of an inpainting mask for the fingerprint image in FIG. 1 that is useful for understanding an inpainting process in accordance to an embodiment of the invention.

Based on the processed fingerprint image 100, the areas for inpainting can then be selected in accordance with an embodiment of the invention to generate an inpainting mask. In general, an area associated with a block is selected based on the amount of fingerprint information available, namely the amount of surrounding blocks. FIG. 2 is an image 200 of an inpainting mask for image 100 that is useful for understanding an inpainting process in accordance to an embodiment of the invention.

As shown in FIG. 2, the blocks selected for inpainting mask in image 200 appear to lie along the borders of the processed fingerprint image 100 in FIG. 1. However, a closer comparison of images 100 and 200 shows that not all of the blocks lying along the of the processed fingerprint image 100 are selected. In the various embodiments of the invention, a methodology is provided to select only the blocks from image 100 lying in areas where the surrounding blocks are likely to have sufficient information to allow extrapolation of fingerprint features with a high degree of confidence are selected. This methodology is described below in greater detail with respect to FIGS. 6-7.

Figure 3:
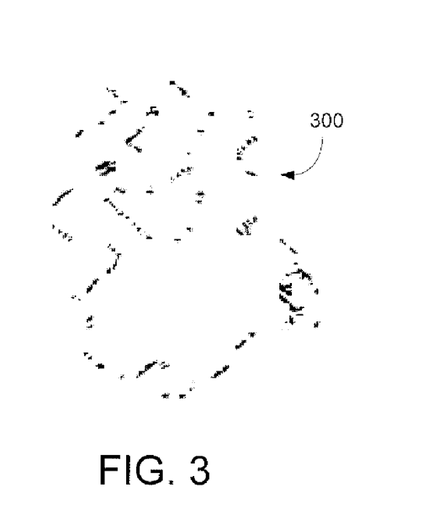
FIG. 3 is an image showing the inpainting provided for the blocks in FIG. 2 that is useful for understanding an inpainting process in accordance to an embodiment of the invention.
Figure 4:
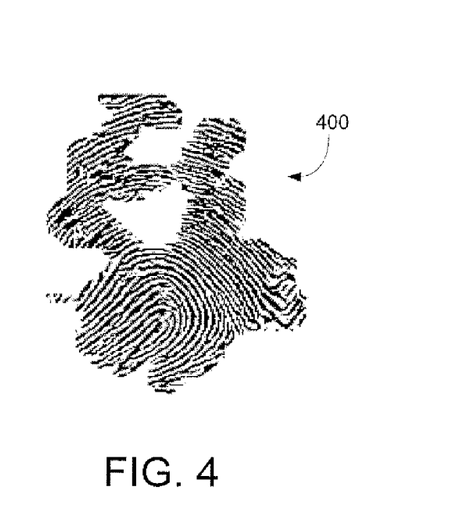
FIG. 4 is an image of the processed fingerprint image in FIG. 1 after inpainting in FIG. 3 is applied that is useful for understanding an inpainting process in accordance to an embodiment of the invention.

After the blocks are selected, the fingerprint features for these blocks can be extrapolated. This is conceptually illustrated in FIG. 3. FIG. 3 is an image 300 showing the inpainting for the blocks in FIG. 2. The fingerprint information for the blocks in image 200 is generated by using the information regarding the direction and types of features collected during image processing. Accordingly, fingerprint features for the inpainted areas in image 300 can be generated, as shown in FIG. 3, based on this fingerprint information. Afterwards, images 100 and 300 can be combined to produce the final fingerprint image, as shown in FIG. FIG. 4 is an image 400 of the processed fingerprint image 100 after the inpainting in FIG. 3 is applied. The combined image 400 can then be used for fingerprint recognition purposes.

One aspect of the invention, as described above, is the identification of blocks for inpainting a fingerprint image. Although such areas can be identified manually, such a process can be extremely time-consuming. Therefore, the various embodiments of the invention provide systems and methods for automating this identification process. In particular, the various embodiments of the invention combine a scoring of blocks in the fingerprint image with a weighting function to determine whether or not to apply inpainting to a particular block. This process is described below in greater detail with respect to FIG. 5

Figure 5:
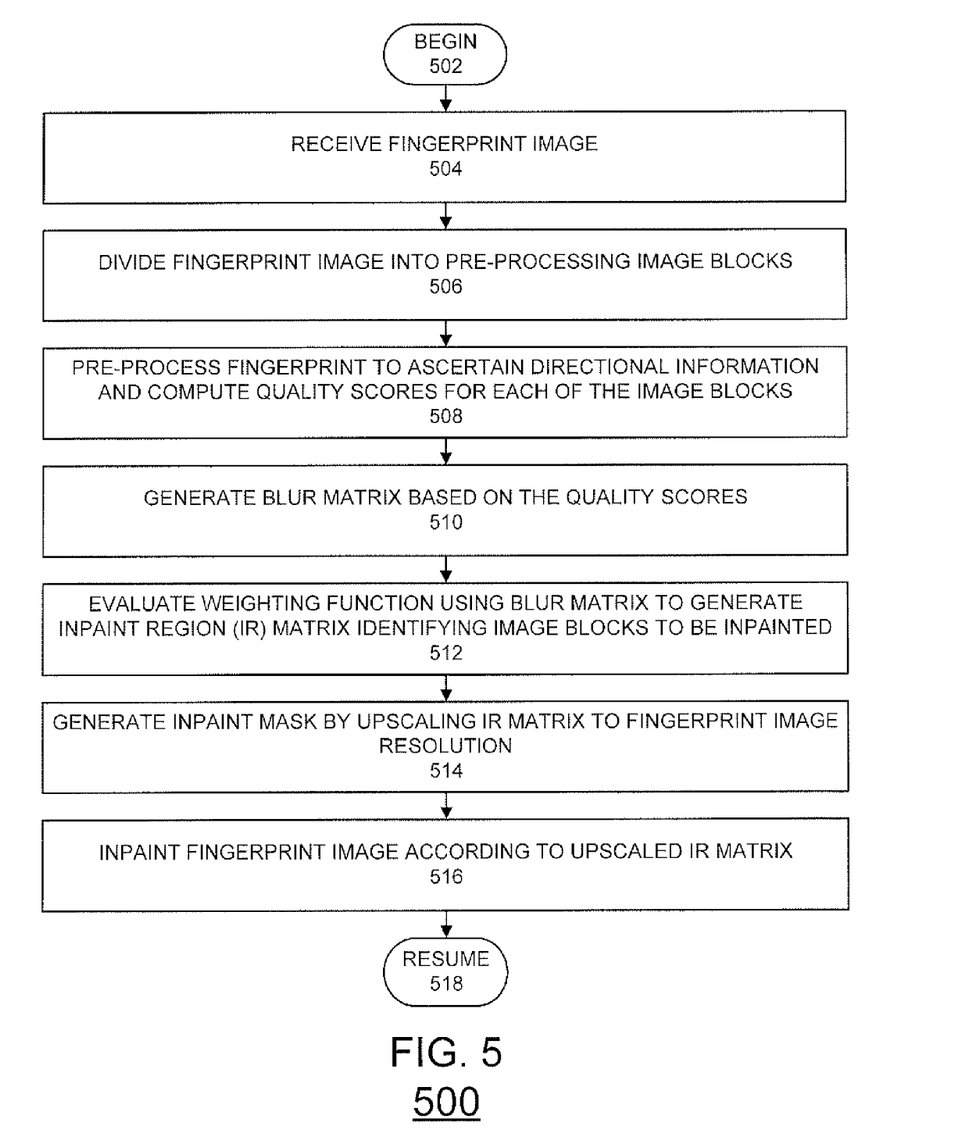
FIG. 5 is a flowchart showing steps in an exemplary method for inpainting areas of an acquired fingerprint image according to an embodiment of the invention.

FIG. 5 is a flowchart showing steps in an exemplary method 500 for inpainting areas of an acquired fingerprint image according to an embodiment of the invention. Method 200 begins at step 502 and continues on to step 504. At step 504, a fingerprint image is received. In the various embodiments of the invention, a received fingerprint image may be generated using a variety of techniques, including ink techniques and solid-state scanning of an individual's fingerprints. However, the invention is not limited in this regard and fingerprint images can also be generated from latent, patent, or plastic fingerprints found at a location and imaged and/or retrieved using one or more forensic methods (e.g., dusting or chemically reactive techniques).

Once the fingerprint image is received at step 504, the image is divided into blocks for image processing at step 506. In one embodiment, the blocks can comprise n×n pixel blocks. Although n can be any integer value, such as 16, 24, or 32, the block size can be selected to limit the number of features present in the n×n pixel blocks. For example, block size can be selected to limit the blocks to show only a portion of one ridge feature or one valley feature. By limiting the block to show only the localized fingerprint features, all features in the block will be expected to have the same or similar directionality information. Such a configuration limits the amount of information that needs to be stored for each block.

Once the fingerprint image is divided into blocks at step 506, image processing of the fingerprint, on a block-by-block basis can be performed. As described above, the blocks can be pre-processed using normalization, binarization, and or thinning to enhance the features in the fingerprint. Additionally, the directional information for the ridges and/or valleys in the block can be ascertained and stored. Furthermore, quality marking is performed to compute a quality score for each of the blocks. That is, for each block, the amount of fingerprint information is analyzed to determine a quality score indicative of the usefulness of the data in the data block. Therefore, blocks with poor image quality or incomplete fingerprint data can be given a low score. For example, if the data in a block does not allow the directional information for the block to be determined with a high degree of confidence or for valley and ridge portions to be clearly identified, the block can receive a low score. In another example, if the block contains incomplete information, the block can also receive a low score. In some embodiments, the block quality scores can be a function of the ridge flow coherency (i.e., any measure of the continuity of ridges are in a block) and strength (i.e., any measure how well defined the ridges are in a block, such as the gradient from a valley to the peak of a ridge) versus threshold value(s) or measure(s). However, the various embodiments of the invention are not limited to the methods described above and any other method for determining a quality score of a block can be used in the various embodiments of the invention.

Based on the quality scores generated at step 508, a blur matrix can be generated at step 510. In the various embodiments of the invention, the blur matrix comprises a reduced matrix as compared to the fingerprint image. That is, if a fingerprint image has pixel dimensions m×l and is divided into n×n blocks, the blur matrix comprises an m/n×l/n matrix. In the various embodiments of the invention, the blur matrix comprises a binary matrix (i.e., a matrix in which each entry is zero or one). The entries for the binary blur matrix are selected based on the quality scores computed at step 508 and a quality score threshold value. Therefore, if a block quality score is greater than or equal to a threshold value, it is given a value of one. Conversely, if a block quality score is less than the threshold value, it is given a value of zero. In general the threshold value can be any amount; however, the threshold value can be adjusted by a user based on various factors. For example, if the amount of the fingerprint image missing is relatively high, a lower threshold value can be used to allow a larger number of blocks to be considered. If the amount of the fingerprint image missing is relatively low, a larger threshold value can be used to limit the introduction of artificial features. In some embodiments, the threshold value can be used as part of an iterative process to provide several inpainting scenarios.

The resulting binary matrix therefore identifies blocks (using a value of one) in the fingerprint image that not only contain useful fingerprint data for identification purposes, but also the blocks that contain useful information for extrapolating fingerprint information. The binary matrix also identifies blocks that can be potentially inpainted (using a value of zero).

Once the blur matrix is generated at step 510, the blur matrix can be used at step 512 to identify the blocks to be inpainted. In particular, a weighting function is evaluated for each location of the blur matrix. The weighting function determines for each block in the blur matrix whether the block has a minimum number of neighboring blocks to permit extrapolation of features into the block with a high degree of confidence. The development of an exemplary weighting function described in greater detail below with respect to in FIGS. 6 and 7. Once evaluated at step 512, the weighting function results in an m/n×l/n binary inpaint region (IR) matrix that defines that the blocks of the image received at step 504 that are to be inpainted.

Once the IR matrix is generated at step 512, the IR matrix can be used to perform inpainting of the received image at steps 514 and 516. First, the IR matrix is upscaled at step 514 to the resolution of the received fingerprint image. The term "upscaling", as used herein, refers to the process of mathematically converting a first image or matrix at a first resolution (i.e., matrix dimensions) to a second image or matrix at a second resolution higher than the first resolution. The upscaling at step 514 can be performed according to one or more interpolation techniques, such as piecewise constant interpolation, linear interpolation, polynomial interpolation, spline interpolation, and Gaussian processing techniques. However, the various embodiments of the invention are not limited in this regard and any type of interpolation technique can be used.

The upscaled IR matrix generated at step 514 can then be used to apply inpainting at step 516. That is, the upscaled IR matrix is used as an inpaint mask to identify the areas of the fingerprint image which should be inpainted with fingerprint information based on fingerprint information from surrounding pixels. Inpainting is then performed according this inpaint mask using inpainting techniques based on extrapolation or other techniques. In the various embodiments of the invention, any type of inpainting method can be used. For example, linear, polynomial, conic, or French curve extrapolation methods, to name a few, can be used in the various embodiments of the invention. Additionally, other inpainting methods, such as those described in U.S. Patent Publication No. 2008/0080752 to Rahmes et al. and U.S. Pat. No. 6,987,520 to Criminisi et al., can also be used in the various embodiments of the invention. However, the various embodiments of the invention are not limited to any particular technique, and any extrapolation or inpainting method can be used with the various embodiments of the invention. Once inpainting is completed at step 516, method 500 continues on to step 518 to resume previous processing. For example, method 500 can be repeated for other fingerprint images or a fingerprint recognition process can be invoked.

As described above, one aspect of the invention is the development of the weighting function used for determining which of image blocks should be included in the IR matrix. The weighting function provides a relative measure of the number of blocks, surrounding a block of interest in the blur matrix, that are likely to include information for extrapolating information for the block of interest. In the various embodiments of the invention, the weighting function can be designed to provide such measure based on the position of surrounding blocks with respect to a block of interest.

Figure 6:
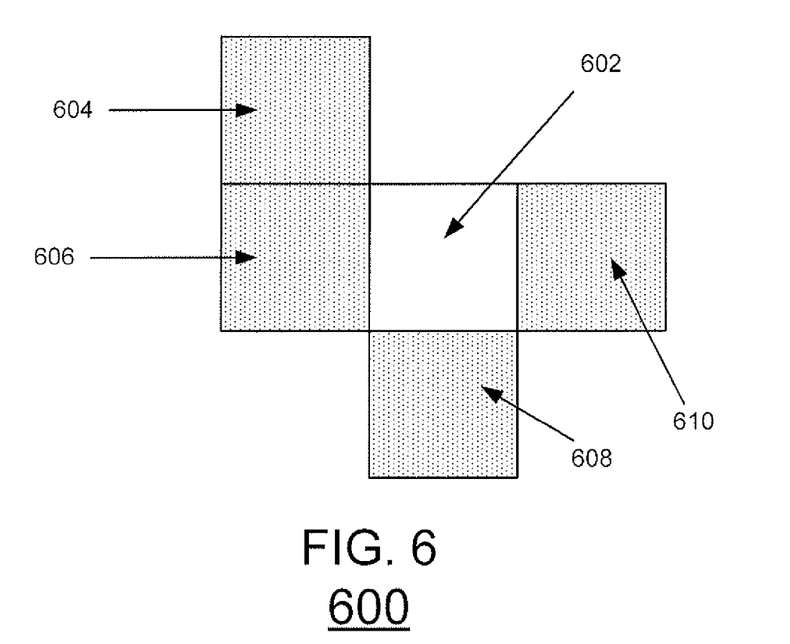
FIG. 6 shows a first exemplary arrangements of blocks in a fingerprint images that is useful for understanding the various embodiments of the invention.

For example, FIG. 6 shows a portion of a fingerprint image 600, where a block marked with a zero in the blur matrix (clear block 602) is surrounded by several blocks (shaded blocks 604, 606, 608, and 610) marked with a one in the blur matrix (i.e., block including good fingerprint data). In general, if a block 602 has one or more directly adjacent blocks (i.e., neighboring blocks including good fingerprint data, on a same row or column as block of interest, and contacting an edge of the block of interest), there is a high likelihood that the features in these directly adjacent blocks will carry over into block 602 and that extrapolation will be accurate. As a result, the weighting function can be designed to mark a block for inpainting if a sufficient number if directly adjacent blocks are identified in the blur matrix. However, in some circumstances, a single adjacent block may not provide sufficient information for inpainting, as it would only define one boundary condition for inpainting in the block of interest. Therefore, in the various embodiments of the invention, the weighting function can be further designed to require two or more directly adjacent blocks in order to identify a block for inpainting. This results in the defining of at least two boundary conditions for the fingerprint information in the block of interest, increasing the accuracy of any subsequent extrapolation and reducing the likelihood of introducing artificial key features into the final fingerprint image.

Figure 7:
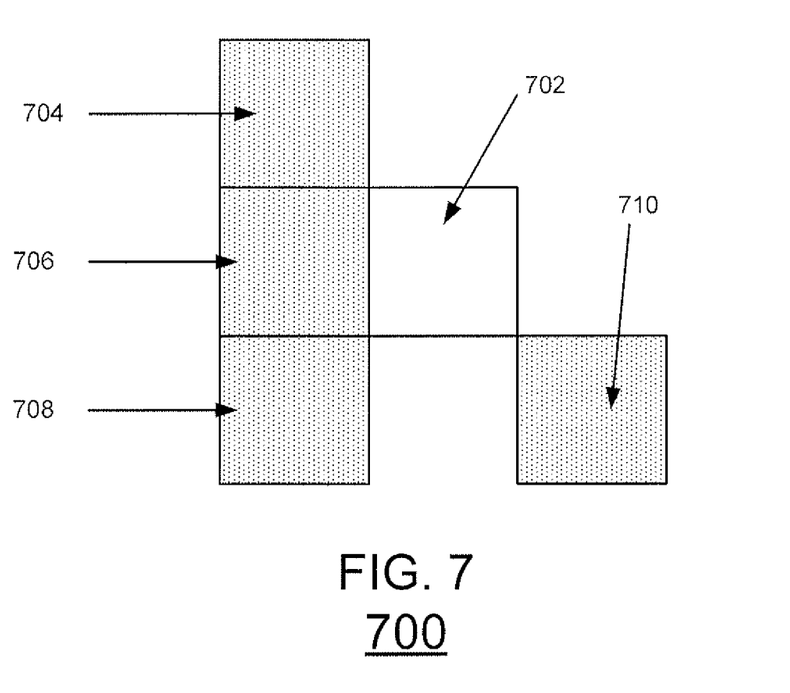
FIG. 7 shows a second exemplary arrangements of blocks in a fingerprint images that is useful for understanding the various embodiments of the invention.

However, some blocks can still be marked for inpainting even though they do not have a sufficient number of directly adjacent blocks. This is conceptually illustrated in FIG. 7. FIG. 7 shows a portion of a fingerprint image 700, where a block marked with a zero in the blur matrix (clear block 702) is surrounded by several blocks (shaded blocks 704, 706, 708, and 710) marked with a one in the blur matrix (i.e., block including good fingerprint data). As described above, if a block 702 has a directly adjacent block, such as block 706, there is a high likelihood that the features in this directly adjacent block will carry over into block 702. However, as also described above, there can still be an issue as to whether the single directly adjacent block can provide sufficient information for accurately extrapolating fingerprint data for the block of interest. Therefore, identification of the block of interest for inpainting can be determined by also looking at other surrounding blocks. In particular, embodiments of the invention provide for the weighting function to consider the directly diagonal blocks (i.e., neighboring blocks including good fingerprint data, on a same diagonal as the block of interest, and contacting a corner of the block of interest). For example, if block 702 is surrounded by both a directly adjacent block 706 and one or more diagonally adjacent blocks, such as one or more of blocks 704, 708, and 710, block 702 can be identified for inpainting. As a result, the weighting function can be designed to mark a block for inpainting if at least one directly adjacent block and directly diagonal blocks are identified in the blur matrix. However, in some circumstances, a single directly diagonal block may not provide sufficient information for inpainting, as it cannot define how the fingerprint may vary on an opposing side or corner of the block of interest. For example, if image 700 included only blocks 704 and 706, it would be difficult to estimate the behavior for the features in block 702 with respect to other edges or corners. Therefore, in the various embodiments of the invention, the weighting function can be further designed to also require two or more diagonal adjacent blocks in order to mark a block of interest for inpainting. This increases the likelihood that subsequently inpainted features are accurate and reduces the likelihood of introducing artificial key features into the final fingerprint image.

By taking into consideration the requirement of two or more directly adjacent blocks and two or more directly diagonal blocks, a weighting function can be developed. In particular, a weight of 2 can be provided for each directly adjacent block and a weight of 1 can be provided for each directly diagonal block (condition 1). Accordingly, if there are at least two directly adjacent blocks for a block of interest, there is at least a weight of (2 blocks×2)=4 associated with the block of interest. If there are at least two directly diagonal blocks for a block of interest and at least one directly adjacent block (condition 2), there is a weight of (2 blocks×1)+2=4 associated with the block of interest. Accordingly, a weighting function can be provided for a block of interest as shown below in Equation (1):

$$(\# \text{ of directly diagonal blocks in Blur}) + 2 \times (\# \text{ of directly adjacent blocks in Blur}) \geq 4 \qquad (1)$$

where Blur is the blur matrix. Therefore, if the Equation (1) evaluates to true, the block can be inpainted. More generally, for an m/n×l/n binary blur matrix, a convolution (C) kernel can be provided as shown below in Equation (2):

$$C = \begin{bmatrix} 1 & 2 & 1 \\ 2 & 0 & 2 \\ 1 & 2 & 1 \end{bmatrix} \qquad (2)$$

The convolution kernel thus provides weighting of directly adjacent blocks equal to 2 and directly diagonal blocks equal to using. Using C, Equation (1) can be rewritten for the blur matrix as shown below in Equation (3):

$$IR = [(C \otimes \text{Blur}) \cap \overline{\text{Blur}}] \geq 4, \qquad (3)$$

where IR is the IR matrix and the intersection of the inverse of the blur matrix is provided so as not apply the convolution kernel to blocks of the fingerprint image with good fingerprint information. Using Equation (3), any blocks marked as a zero in the blur matrix and meeting either of condition 1 or condition 2, as described above, can then be automatically identified and the inpaint mask can be directly derived.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 8:
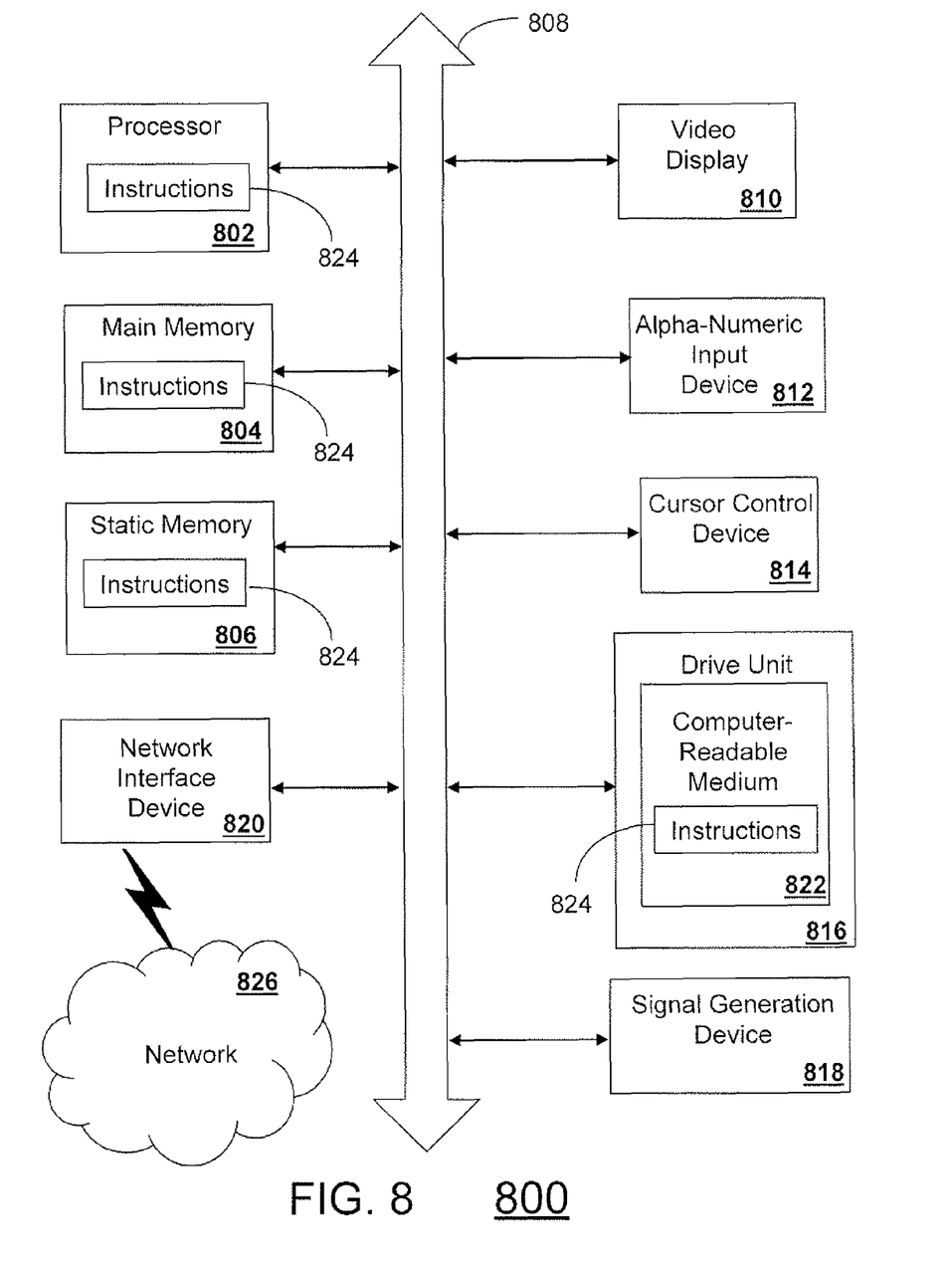
FIG. 8 is a block diagram of a computer system that may be used in embodiments of the invention.

The computer system 800 of FIG. 8 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 800 includes a processor 802 (such as a central processing unit (CPU), a graphics processing unit (GPU, or both), a main memory 804 and a static memory 806, which communicate with each other via a bus 808. The computer system 800 can further include a display unit 810, such as a video display (e.g., a liquid crystal display or LCD), a flat panel, a solid state display, or a cathode ray tube (CRT)). The computer system 800 can include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 includes a computer-readable storage medium 822 on which is stored one or more sets of instructions 824 (e.g., software code) configured to implement one or more of the methodologies, procedures, or functions described herein. The instructions 824 can also reside, completely or at least partially, within the main memory 804, the static memory 806, and/or within the processor 802 during execution thereof by the computer system 800. The main memory 804 and the processor 802 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

In the various embodiments of the present invention a network interface device 820 connected to a network environment 826 communicates over the network 826 using the instructions 824. The instructions 824 can further be transmitted or received over a network 826 via the network interface device 820.

While the computer-readable storage medium 822 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Those skilled in the art will appreciate that the computer system architecture illustrated in FIG. 8 is one possible example of a computer system. However, the invention is not limited in this regard and any other suitable computer system architecture can also be used without limitation.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

What is claimed is:

1. A method for inpainting areas in a fingerprint image, the method comprising:
    dividing a fingerprint image into a plurality of image blocks;
    computing a plurality of block scores for said plurality of image blocks;
    generating a blur matrix for the fingerprint image based on said plurality of block scores; and
    deriving an inpaint region (IR) matrix for the fingerprint image based on a weighting function and said blur matrix, said IR matrix identifying a portion of said plurality of image blocks for inpainting.

2. The method of claim 1, wherein the step of dividing further comprises selecting each of said plurality of image blocks to comprise n×n pixel blocks, where n is an integer and >0.

3. The method of claim 2, wherein n equals 16.

4. The method of claim 1, wherein said computing further comprises:
    applying image processing to said image to generate a processed fingerprint image; and
    calculating said plurality of block scores based on said processed fingerprint image.

5. The method of claim 1, wherein said computing further comprises:
    determining fingerprint key features in each of said plurality of image blocks;
    evaluating image quality values for each of said plurality of image blocks; and
    calculating said plurality of block scores based on said fingerprint key features and said quality values.

6. The method of claim 1, wherein blur matrix comprises a plurality of 1-bit values.

7. The method of claim 1, wherein said deriving comprises selecting said weighting function to evaluate for each of said plurality of blocks the condition:

(# of directly diagonal blocks in Blur)+2×(# of directly adjacent blocks in Blur)≧4, where Blur comprises said blur matrix.

8. The method of claim 1, wherein said deriving further comprises selecting said weighting function to comprise:

$$IR = \left[ \left( \begin{bmatrix} 1 & 2 & 1 \\ 2 & 0 & 2 \\ 1 & 2 & 1 \end{bmatrix} \otimes \text{Blur} \right) \bigcap \overline{\text{Blur}} \right] \geq 4,$$

where Blur comprises said blur matrix and IR comprises said IR matrix.

9. The method of claim 1, further comprising:
    upscaling said IR matrix to a resolution of said fingerprint image;
    performing inpainting in said fingerprint image according to said upscaled IR matrix.

10. A fingerprint processing system, comprising:
    a storage element for storing a fingerprint image;
    a processing element communicatively coupled to said storage element, wherein said processing element is configured for:
    dividing at said fingerprint image into a plurality of image blocks;
    computing a plurality of block scores for said plurality of image blocks;
    generating a blur matrix for the fingerprint image based on said plurality of block scores; and
    deriving an inpaint region (IR) matrix for the fingerprint image based on a weighting function and said blur matrix, said IR matrix identifying a portion of said plurality of image blocks suitable for inpainting.

11. The fingerprint processing system of claim 10, wherein the processing element is further configured during said dividing for selecting each of said plurality of image blocks to comprise n×n pixel blocks, where n is an integer and >0.

12. The fingerprint processing system of claim 11, wherein n equals 16.

13. The fingerprint processing system of claim 10, wherein the processing element is further configured during said computing for:
    applying image processing to said image to generate a processed fingerprint image; and
    calculating said plurality of block scores based on said processed fingerprint image.

14. The fingerprint processing system of claim 10, wherein the processing element is further configured during said computing for:
    determining fingerprint key features in each of said plurality of image blocks;
    evaluating image quality values for each of said plurality of image blocks; and
    calculating said plurality of block scores based on said fingerprint key features and said quality values.

15. The fingerprint processing system of claim 10, wherein said convolution function comprises:

$$IR = \left[ \left( \begin{bmatrix} 1 & 2 & 1 \\ 2 & 0 & 2 \\ 1 & 2 & 1 \end{bmatrix} \otimes \text{Blur} \right) \bigcap \overline{\text{Blur}} \right] \geq 4,$$

where Blur comprises said blur matrix and IR comprises said IR matrix.

16. The fingerprint processing system of claim 10, further comprising:
    upscaling said IR matrix to a resolution of said fingerprint image;
    performing inpainting in said fingerprint image according to said upscaled IR matrix.

17. A non-transitory computer-readable storage medium, having stored thereon a computer program for inpainting areas in a fingerprint image, the computer program having a plurality of code sections, the code sections executable by a computer to cause the computer to perform the steps of:

dividing a fingerprint image into a plurality of image blocks;
computing a plurality of block scores for said plurality of image blocks;
generating a blur matrix for the fingerprint image based on said plurality of block scores; and
deriving an inpaint region (IR) matrix for the fingerprint image based on a weighting function and said blur matrix, said IR matrix identifying a portion of said plurality of image blocks suitable for inpainting.

18. The non-transitory computer-readable storage medium of claim 17, wherein the code sections for the step of dividing further comprise code sections for selecting each of said plurality of image blocks to comprise n×n pixel blocks, where n is an integer and >0.

19. The non-transitory computer-readable storage medium of claim 17, wherein the code sections for said step of said computing further comprise code sections for:
applying image processing to said image to generate a processed fingerprint image;
determining fingerprint key features in each of said plurality of image blocks in said processed image;
evaluating image quality values for each of said plurality of image block in said processed image; and
calculating said plurality of block scores based on said fingerprint key features and said quality values.

20. The non-transitory computer-readable storage medium of claim 17, wherein code sections for deriving further comprise code sections for defining said convolution function as:

$$IR = \left[ \left( \begin{bmatrix} 1 & 2 & 1 \\ 2 & 0 & 2 \\ 1 & 2 & 1 \end{bmatrix} \otimes \text{Blur} \right) \bigcap \overline{\text{Blur}} \right] \geq 4,$$

where Blur comprises said blur matrix and IR comprises said IR matrix.

* * * * *